April 29, 1952     H. E. RINGGOLD     2,594,997
POWER-DRIVEN RECIPROCATING DRAG SAW HAVING
TWO OPPOSITELY RECIPROCATING BLADES
Filed June 16, 1948                           2 SHEETS—SHEET 1
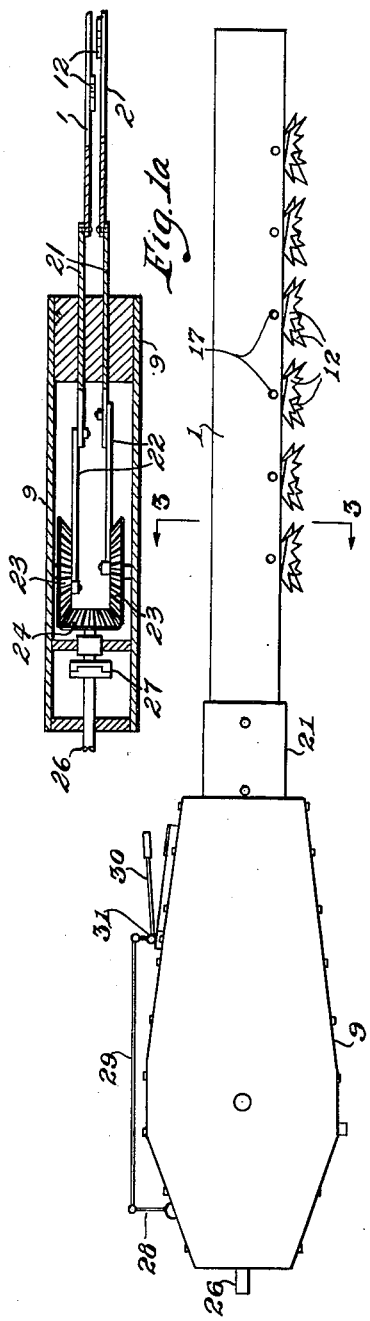
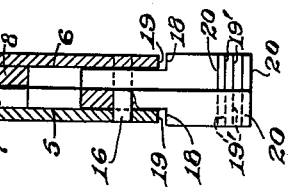
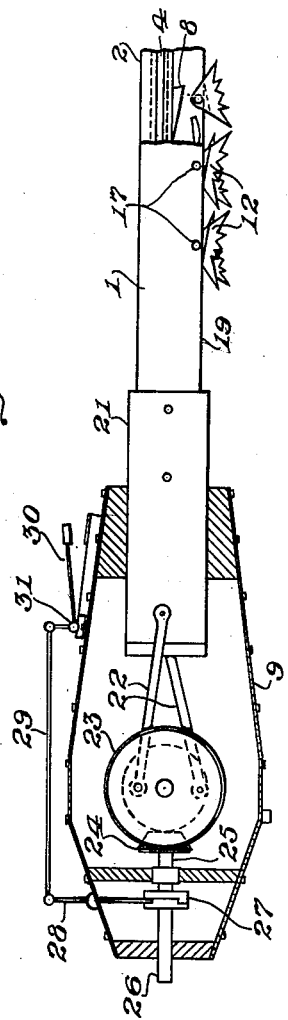
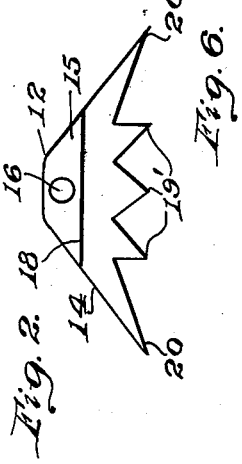
Inventor,
Homer E. Ringgold,
by J. Stuart Freeman,
Attorney.

April 29, 1952     H. E. RINGGOLD     2,594,997
POWER-DRIVEN RECIPROCATING DRAG SAW HAVING
TWO OPPOSITELY RECIPROCATING BLADES
Filed June 16, 1948     2 SHEETS—SHEET 2
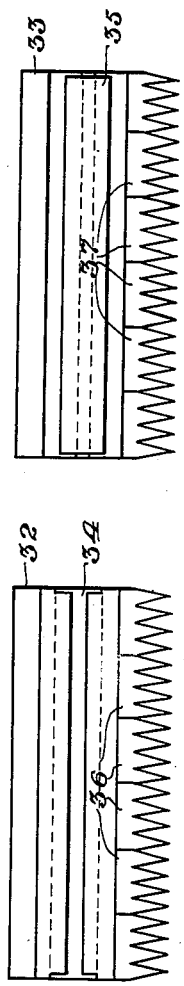
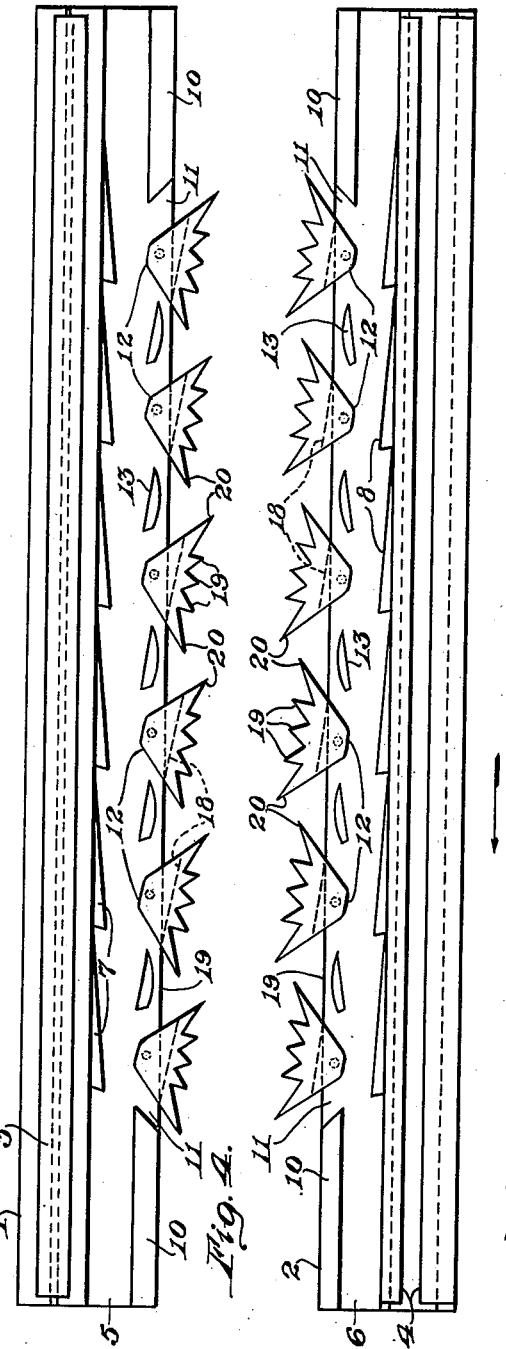
Inventor,
Homer E. Ringgold,
by J. Stuart Freeman.
Attorney.

Patented Apr. 29, 1952

2,594,997

UNITED STATES PATENT OFFICE 2,594,997

POWER-DRIVEN RECIPROCATING DRAG SAW HAVING TWO OPPOSITELY RECIPROCATING BLADES

Homer E. Ringgold, Milford, Del.

Application June 16, 1948, Serial No. 33,281

7 Claims. (Cl. 143—63)

The object of the invention is to provide improvements in saws, but more specifically in the type of saw that is used in lumbering operations, and involves the felling of big trees.

Another object is to provide a double-blade saw, the blades of which are secured together in such manner as to permit relative reciprocation between them longitudinally, and each blade being provided with a plurality of cutting units, each unit comprising a plurality of teeth, and each unit being angularly oscillatable about the axis of a pivot by which it is mounted for limited angular movement upon and in the plane of one of said blades, with means to move the blades simultaneously in opposite directions.

A further object is to provide the respective blades of such a saw with opposed grooves which together form a channel for the reception of sawdust from said toothed cutting units, said grooves opening through one end of said blades for the discharge of sawdust therefrom beyond the longitudinal limits of said blades.

Still another object is to provide means in each of said channels to propel sawdust towards and from the open end thereof, said means comprising elongated, ratchet-shaped teeth or lugs having abruptly terminating ends directed in one direction common to both of them.

A still further object is to provide in such a saw cutting units of which each comprises an arcuate arrangement of teeth that progressively increase in radial length from the center towards the opposite ends of each unit, so that the lead tooth of each unit engages the wood at an acute angle as would a chisel, and the oppositely directed, acutely positioned teeth of the cutting units of the two blades upon passing each other closely during the normally opposite movement of said blades, and lift fibers within and from the sawcut, which is as wide as the two blades combined.

With the objects thus briefly stated, the invention comprises further details, construction and operation, which are hereinafter fully brought out in the following specification, when read in conjunction with the accompanying drawings, in which Fig. 1 is a side elevation of a double-bladed saw comprising one embodiment of the invention; Fig. 1a is a horizontal section through the center-line of the operating head; Fig. 2 is a fragmentary portion of the same, showing the interior of the operating head and a portion only of the two blades; Fig. 3 is an enlarged section on the line 3—3 of Fig. 1; Fig. 4 is a similarly enlarged elevation of the inner surface of one of said blades with its series of cutting units mounted thereon, and in the positions that they occupy when the blade is travelling in the direction of the arrow; Fig. 5 is an inverted enlarged elevation of the inner surface of the other of said blades with its series of cutting units in the positions they occupy when travelling in the direction of the adjacent arrow, the directions of movement is being noted being in opposite directions; Fig. 6 is a plan view of one of the cutting units per se; Fig. 7 is an inner surface elevation of one of the blades of a modified form of the invention; Fig. 8 is a similar view of the other blade of this modification.

Referring to Figs. 1 to 6 of the drawings, the improved saw comprises essentially a pair of frame members 1 and 2, the former being provided with a so-called tongue 3 of T-shaped cross section, while the latter is provided with a groove 4 of similar shape, said tongue and groove extending substantially the entire length of the respective blades. Said blades are also provided with oppositely positioned, parallel sawdust-receiving grooves 5 and 6 of rectangular or other suitable cross section, and with a plurality of elongated ratchet-toothlike teeth 7 and 8 that have their abruptly terminating ends directed towards the outer free end of the composite saw, that is, away from the operating head 9 shown in Figs. 1 and 2, and toward the left end of each member when viewed as in Figs. 4 and 5. In the normal operation of the device, the abraded wood particles enter the grooves 5—6 in such quantities above each cutting unit, as the frame members rapidly reciprocate, that said grooves would soon become jammed were it not for the fact that the toothlike means 7—8, by facing in one direction and reciprocating with their respective supporting members, tend to propel the wood particles towards the forward end and away from the operating head of the device, and thereby remove the loose wood from the sawcut.

Each of the sawdust-receiving grooves is bounded upon the side away from their respectively adjacent tongue or groove with a raised beading 10, which grooves are interrupted or cut away from a portion of their lengths to provide spaces 11 in which are oscillatably mounted the improved form of cutting units 12. Between said cutting units integral lugs 13 extend inwardly from each of said blades and act as spacing means to prevent binding of the cutting units of the two blades as they pass each other. In this way sufficient space is provided for each cutting unit in which it is free to oscillate from one extreme position to the other, and still leave sufficient spaces between the unit and the beading 10 and one of the lugs 13, or between the unit and two of said lugs, as the case may be, for the free passage of sawdust into the complementary grooves 5 and 6.

As to the cutting units, one of these is shown in Fig. 6 alone, while they are also shown as parts of the saw as a whole in Figs. 1 to 5 inclusive. Each unit comprises a body portion 14 that is flat and uninterrupted by any surface irregularities upon one side, while its opposite side is recessed or thinned at 15 throughout that angular portion of it that extends between the saw blades, the first-mentioned flat sides of a pair of said units being in slidable contact as the respective blades which carry them reciprocate in opposite directions, as indicated in Fig. 3. From the wall of the recess 15 there arises centrally either an integral or a separable pin 16, that extends slidably into one of the apertures 17 in one of the saw blades 1 and 2, and which pin forms a pivot mounting for oscillatably securing the unit in operative position, the degree of oscillation of the unit being limited by cooperation of one or the other end of a shoulder 18, that comprises a wall of said recess 15 and which abuts against the normally under edge or surface 19 of the supporting blade.

When viewed as operatively assembled within and as a unitary part of the composite saw, that portion of the cutting unit that projects from between the blades comprises a series of teeth 19 and 20. The central teeth 19 are of substantially conventional shape, while the oppositely positioned teeth 20 are much more acute, and instead of their leading edges dragging over the inner surface of the sawcut as is customarily the case, they function more as chisels and each of them undercuts the wood of one half the width of the sawcut at the bottom of the cut, thus raising it somewhat as a chisel or plane raises its shaving. In this way one such unit tooth cuts its half "shaving" away from one wall of the sawcut and after deflecting it upwardly from the bottom thereof into the complementary grooves 5—6, a blade of a passing unit cuts the other half of the shaving from the bottom of its side of the cut, and the wood thus cut is also deflected upwardly as so-called sawdust and passes between the cutting units and into the complementary registering grooves 5—6, where it is forced by subsequently intermittently added quantities towards one or the other end thereof by the reciprocating ratchetlike teeth 7 and 8, and is pushed by succeeding wood particles and in time discharged from the free end of the combined blades.

For relative reciprocation of the said blades any suitable mechanism may be employed. In the embodiment here illustrated said blades are detachably secured to supporting elements 21, which extend slidably into an enlarged hollow operating head 9. Each of said elements is connected by means of a pivoted link 22 to one of a pair of bevel gears 23, which rotate in opposite directions as driven by an intervening bevel pinion 24. This pinion is driven by a shaft 25, that connects through a flexible coupling 26 with any suitable source of power (not shown), said shafts being operatively connected at will by means of a clutch 27, that is here shown conventionally as being actuated by a lever 28, that is connected through an intervening link 29 with a manually actuable lever 30 pivotally carried at 31 by said operating head. However, it must be understood that the means of operation here shown is purely illustrative and is not intended in any way to limit the scope of the invention, that primarily resides in the construction and inter-relationship of the two blades and the plurality of cutting units carried by them, the sawdust receiving channel and the impelling means within said channel.

In considering the present invention, it is to be also understood that it is not limited to the exact shape of the respective cutting units, the shape, size and cross section of the interlocking tongue-and-groove connection, the number and shape of the sawdust-propelling, ratchetlike teeth 7 and 8, but only to the operative relationship of these several parts, and the general construction, functioning and operation of the composite whole.

Referring to Figs. 7 and 8, short lengths of a simplified form of the invention is shown as comprising a pair of blades 32 and 33, one of which is provided with a groove 34 of substantially T-shaped cross section, while the other is provided with a tongue 35 of similar cross section, said tongue and groove preferably extending substantially the entire length of the respective blades and being closely slidable with respect to each other. In this instance the cutting elements are not oscillatably carried by the respective blades, but comprise shortened toothed sections 36 detachably carried by said blades. The teeth of these sections are in general of the more conventional type and may be said to drag upon and thereby abrade the wood of the sawcut, as distinguished from undercutting the same as a chisel, and as hereinbefore described with respect to the preferred form of the invention. As in the embodiment hereinbefore first described, the two modified blades may be relatively reciprocated by any suitable driving mechanism, as for example the operating head 9 above described.

Having thus described my invention, what I claim and desire to protect by Letter Patent of the United States is:

1. A saw, comprising a pair of relatively reciprocatory members secured together in slidable engagement and forming between them a longitudinal channel open at one end and along one side, means to reciprocate said members alternately in opposite directions, toothed elements pivotally carried by said members within said channel and protruding through the open side thereof, each of said elements comprising a series of teeth, those teeth at the opposite ends of said series alternately engaging the bottom of a sawcut at an acute angle, while the intervening teeth in engagement with the bottom of the sawcut operate to angularly oscillate the element at each change in direction of the member carrying it, means to limit the angular movement of said elements in opposite directions, passageways to permit sawdust deflected upwardly by said elements to enter said channel, and means facing in one direction in said channel and reciprocatable with said members to propel sawdust therein towards one end thereof.

2. A saw, comprising a pair of relatively reciprocatory members each of said members having a side face, one of said members further having a longitudinally extending cut-away portion opening at one side and at one longitudinal edge of said member, means slidably securing said members together with said faces abutting each other, and the other of said members overlying said cut-away portion, whereby said members together define a single longitudinally extending recess opening in one direction, the longitudinal edge surfaces of said members at the mouth of said channel providing a pair of spaced bearing surfaces, power means to actuate said members simultaneously in opposite directions, and toothed elements pivotally carried by each of said members in said recess and operative to assume opposite angular positions as the direction of movement of said members changes, each of said elements comprising a laterally outwardly directed shoulder that overhangs and is engageable with the bearing surface of its supporting member, to limit the oscillatory movement of said elements in opposite directions.

3. A saw, comprising a pair of relatively reciprocatory members each of said members having a side face, one of said members further having a longitudinally extending cut-away portion opening at one side and at one longitudinal edge of said member, means slidably securing said members together with said faces abutting each other, and the other of said members overlying said cut-away portion, whereby said members together define a single longitudinally extending recess opening in one direction, the longitudinal edge surfaces of said members at the mouth of said channel providing a pair of spaced bearing surfaces, power means to actuate said members simultaneously in opposite directions, toothed elements pivotally carried by said members within and protruding from said recess, and operative to assume opposite angular positions as the direction of movement of said members changes, and a shoulder carried by each element that overhangs and is engageable with the bearing surface of its supporting member laterally of said recess, to limit the angular movement of said elements, said elements passing closely by one another within and extending freely from said recess to combine in producing a single sawcut.

4. A saw, comprising a pair of reciprocatory members, means to slidably secure said members together, power means to actuate said members simultaneously in opposite directions, a sawdust-receiving channel between said members and open at one end, toothed elements pivotally carried by each of said members within and extending freely from said channel and operative to assume opposite angular positions as the direction of movement of said members changes and to direct sawdust into said channel, means to limit the angular movement of said elements, and ratchet-toothlike means carried by said members in said channel to propel sawdust towards and from said one end of said members as said members rapidly reciprocate.

5. A saw, comprising a pair of reciprocatory members, means to slidably secure said members together, power means to actuate said members simultaneously in opposite directions, a sawdust-receiving channel between said members and open at one end, toothed elements pivotally carried by each of said members within and extending freely from said channel and operative to assume opposite angular positions as the direction of movement of said members changes and to direct sawdust into said channel, and means to limit the angular movement of said elements, said elements passing closely by one another to combine in producing a single sawcut, and ratchet-toothlike means carried by said members in said channel and reciprocatable with said members to propel sawdust into and from said one end of said channel.

6. A saw, comprising a pair of relatively reciprocatory members, a tongue-and-groove joint between and securing said members together in slidable cooperation, a longitudinally extending channel between said members open along one side to receive sawdust and open at one end to discharge sawdust therefrom, a power head into which one end of each of said members extends, means within said head to reciprocate said members simultaneously in opposite directions, toothed elements pivotally carried by said members within said channel and protruding through the open side thereof, and ratchet-toothlike means in said channel to propel sawdust towards said discharge end, and means to limit the angular movement of said elements in relatively opposite directions.

7. A saw, comprising a pair of relatively reciprocatory members, a tongue-and-groove joint between and securing said members together in slidable cooperation, and forming between them a longitudinal channel open at one end and along one side, a power head into which one end of each of said members extends, means within said head to reciprocate said members simultaneously in opposite directions, toothed elements pivotally carried by said members within said channel and protruding from between said members through the open side of said channel, and ratchet-toothlike means in said channel reciprocatable with said members to propel sawdust within and towards the open end of said channel.

HOMER E. RINGGOLD.

REFERENCES CITED

The following references are of record in the file of this patent:

UNITED STATES PATENTS

| Number | Name | Date |
|---|---|---|
| 108,425 | Young | Oct. 18, 1870 |
| 139,426 | Scholfield | May 27, 1873 |
| 1,414,265 | Dylnicki | Apr. 25, 1922 |
| 1,537,980 | Asselin | May 19, 1925 |
| 1,726,863 | Singer | Sept. 3, 1929 |
| 2,085,756 | Joy | July 6, 1937 |